United States Patent [19]

Crocker et al.

[11] 3,875,488

[45] Apr. 1, 1975

[54] INERTIALLY STABILIZED GIMBAL PLATFORM

[75] Inventors: Thomas H. Crocker, Burlington; Barry N. Levitt, Framingham, both of Mass.

[73] Assignee: Raytheon Company, Lexington, Mass.

[22] Filed: Feb. 15, 1973

[21] Appl. No.: 332,856

[52] U.S. Cl. .................. 318/648, 318/694, 74/5.4
[51] Int. Cl. ........................................... B64c 17/02
[58] Field of Search ........... 318/648, 694; 74/5, 5.4, 74/5.6; 323/44

[56] References Cited
UNITED STATES PATENTS

| | | | |
|---|---|---|---|
| 3,237,055 | 2/1966 | Riordan | 317/123 |
| 3,363,169 | 1/1968 | Nicoletti | 323/44 |
| 3,368,410 | 2/1968 | Dew | 74/5 |
| 3,368,411 | 2/1968 | Sann | 74/5.4 |
| 3,398,341 | 8/1968 | Dooley et al. | 318/649 |
| 3,456,511 | 7/1969 | Clark | 74/5.4 |
| 3,483,761 | 12/1969 | Houghton | 74/5.4 |
| 3,557,629 | 1/1971 | Querman | 74/5.6 |
| 3,704,406 | 11/1972 | Lindsey | 318/648 |
| 3,704,407 | 11/1972 | Lindsey | 318/648 |

*Primary Examiner*—B. Dobeck
*Attorney, Agent, or Firm*—Richard M. Sharkansky; Philip J. McFarland; Joseph D. Pannone

[57] ABSTRACT

An inertially stabilized gimbal platform is disclosed wherein the gyros used in such system operate about their mechanical null positions and control the gimbal drive means through an electronic control section. The electronic control section includes a control signal which is combined with the gyro output to provide a drive signal for the gimbal drive means. The control signal is proportional to the offset between the electrical null position and the mechanical null position of the gyro. The control signal may be modified in accordance with platform command signals to orient the platform in a desired attitude.

5 Claims, 4 Drawing Figures

INERTIALLY STABILIZED GIMBAL PLATFORM

The invention herein described was made in the course of or under a contract or subcontract thereunder, with the Department of Defense.

BACKGROUND OF THE INVENTION

This invention relates generally to gyroscopic apparatus and to inertially stabilized gimbal platforms incorporating such gyroscopic apparatus.

As is known in the art, an inertially stabilized gimbal platform generally includes gyros mounted to such platform to sense angular rates about each one of three mutually orthogonal axes. As is also known, after a gyro has been placed in an operating condition, the mass therein, in the absence of any angular rate input thereto, becomes positioned at a mechanical null position.

It is desired that a gyro be designed so that the mechanical null position is coincident with the electrical null position (i.e. that position of the mass where, in the absence of any angular rate input, the gyro's pickoff produces a zero signal. However, in practical design, there is a small deviation or offset between the electrical and mechanical null positions of the gyro. As a consequence of such offset the gyro pickoff produces an offset signal. This offset signal causes the gyro to drift when it is incorporated into an inertially stabilized gimbal platform because the mass tends to position itself at the mechanical null position.

In applications where the drift, sometimes called a fixed gyro drift, is of significance, the gyro includes within it a torque motor and associated electronic section. The electronic section inserts a bias signal into the gyro's torque motor which drives the mass to the electrical null position. Therefore, in the absence of any angular rate input, the gyro's pickoff will produce a zero output signal. The effect therefore is to cause the gyro to operate about the electrical null position rather than about its mechanical null position. However, operating the gyro about the electrical null position requires the use of a torque motor and additional electronic section within the gyro, thereby increasing the weight, size and cost of such gyro.

As is also known in the art, it is frequently desirable to position the platform in some desired or commanded orientation. Generally platform command signals are applied to the gyro's torque motor to rotate the mass off the electrical null position. The signal produced by the pickoff as a result of such rotation drives the gimbal torque motor fed by such pickoff to thereby change the orientation of the platform to the commanded orientation. When the platform reaches the commanded orientation the gyro again operates about the electrical position by insertion of a bias signal into the electronic section as described. The rate of change in platform orientation is directly related to the amount of current fed into the gyro's torque motor. Therefore, in order for the platform to change orientation rapidly relatively large current capacity windings may be required for the gyro's torque motor with concomitant greater gyro cost, weight and size.

SUMMARY OF THE INVENTION

With this background of the invention in mind, it is an object of this invention to provide an inertially stabilized gimbal platform incorporating gyros having relatively low weight, size and cost and without requiring a torque motor and associated electronic section within such gyro to eliminate unwanted fixed gyro drifts.

It is another object of the invention to provide, in a system for positioning an inertially stabilized gimbal platform in a desired direction, a gyro having low weight, cost and size, and without requiring a torque motor and associated electronic section within such gyro to enable such positioning.

These and other objects of the invention are attained generally by providing an inertially stabilized gimbal platform with gyros mounted to such platform, the pickoffs of such gyros being coupled to the gimbal drive torque motors of such platform through control electronic sections, and by including in such control electronic sections a source of control signals the levels of which are proportional to the offset between the mechanical and electrical null positions of such gyros. Means are provided to insert command signals into such electronic sections to change the control signals in accordance with platform command signals.

BRIEF DESCRIPTION OF THE DRAWINGS

Other objects and many of the attendant advantages of the invention will be readily appreciated as the same becomes better understood by reference to the following detailed description when considered in connection with the accompanying drawings wherein.

DESCRIPTION OF THE PREFERRED EMBODIMENTS

Figure 1:
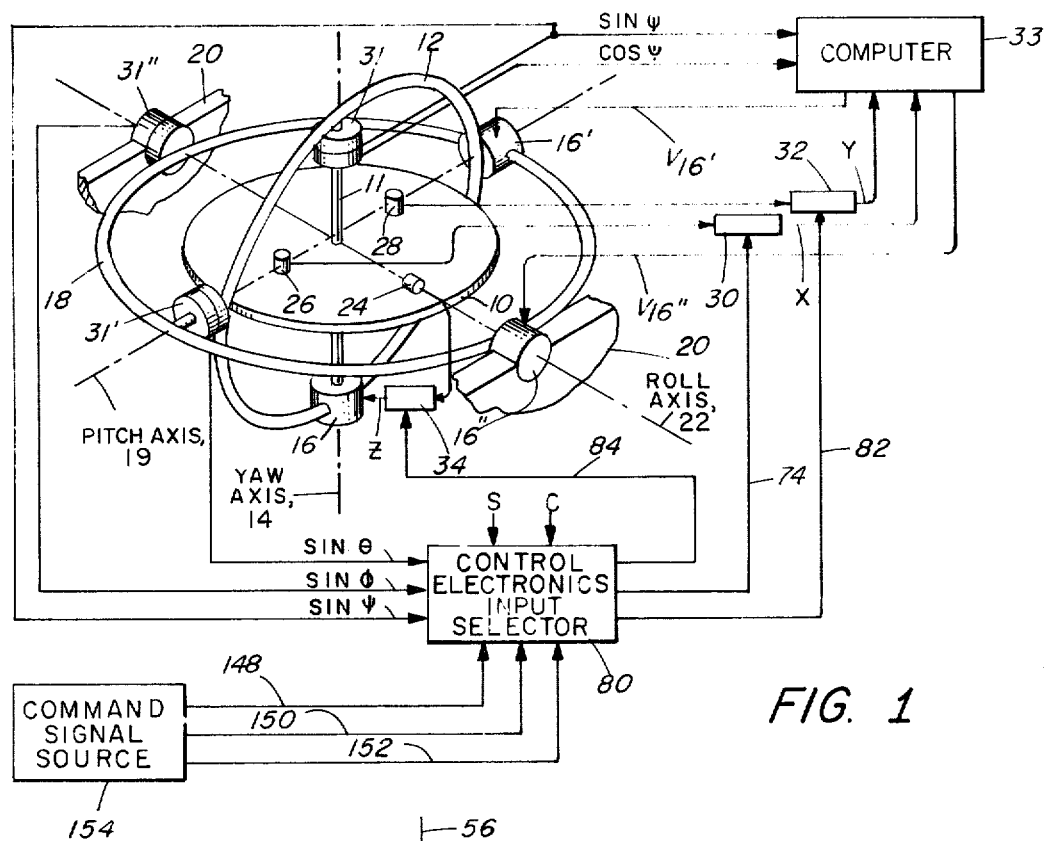
FIG. 1 is a sketch of an inertially stabilized gimbal platform system according to the invention.

Referring now to FIG. 1, an inertially stabilized gimballed platform 10 having three degrees of freedom is shown. Such platform is supported by a rod 11 and is adapted to rotate with respect to an inner gimbal 12 about a yaw axis 14 by means of a gimbal torque motor 16. The relative angular rotation of the platform 10 with respect to the inner gimbal 12 is defined as the yaw angle $\psi$ of the platform 10. The inner gimbal 12 (along with the platform 10 and rod 11) is adapted to rotate with respect to an outer gimbal 18 about a pitch axis 19 by means of a gimbal torque motor 16'. The relative angular rotation of the inner gimbal 12 with respect to the outer gimbal 18 is defined as the pitch angle $\theta$ of the platform 10. The outer gimbal 18 (and all elements within it) is adapted to rotate with respect to a support frame 20 about a roll axis 22 by means of a gimbal torque motor 16''. The relative angular rotation of the outer gimbal 18 with respect to the support frame 20 is defined as the roll angle $\phi$ of the platform 10.

The platform 10 is inertially stabilized by properly processing each output of three gyros, here rate integrating gyros 24, 26, 28. The outputs of gyros 24, 26, 28 are applied to control electronics sections 34, 30, 32, respectively, as shown. The details of such electronics sections 30, 32, 34 will be described later; suffice it to say here that the outputs thereof are designated X, Y and Z respectively, as shown. Rate integrating gyro 24 is affixed to platform 10 to produce a signal which is indicative of the angular rate of the platform 10 about yaw axis 14. Rate integrating gyros 26 and 28 are affixed to platform 10 so that the signal produced at each one's respective output is indicative of the angular rate of the platform 10 about a mutually orthogonal axis, i.e. the roll and pitch axes, respectively. The signal at the output of gyro 26 is indicative of the angular rate of the platform 10 about the roll axis 22 and the signal at the output of the gyro 28 is indicative of the angular rate of the platform 10 about pitch axis 19. However, because the pitch and roll axes 19, 22 may not be aligned with their appropriate gyro input axes, the angular rates sensed by gyros 26, 28 must be transformed in accordance with the yaw angle $\psi$. In particular, a signal $V_{16}'$ coupled to the torque motor 16' must be derived as follows:

$$V_{16}' = X \sin \psi + Y \cos \psi$$

Eq. (1)

where: $X$ is related to the angular rate sensed by rate sensing gyro 26; and $Y$ is related to the angular rate sensed by rate sensing gyro 28;
and a signal $V_{16}''$ coupled to the torque motor 16" must be derived as follows:

$$V_{16}'' = X \cos \psi - Y \sin \psi$$

Eq.(2)

The functions $\sin \psi$ and $\cos \psi$ are here obtained by signals produced by angular displacement measuring apparatus, here a conventional resolver 31. Such resolver 31 is mounted between the inner gimbal 12 and the rod 11 in a conventional manner. The signals produced by such resolver 31 and the signals X, Y (i.e. those produced at the output of control electronics sections 30, 32, respectively, as shown) are combined in accordance with Equations (1) and (2) in a computer 33. Computer 33 therefore produces the signals $V_{16}'$ and $V_{16}''$ respectively, as shown. Resolvers 31" and 31' are mounted as shown, for reasons to become apparent, to provide a measure of $\sin \phi$ where $\phi$ = roll angle and $\sin \theta$ where $\theta$ = pitch angle, respectively.

Figure 2:
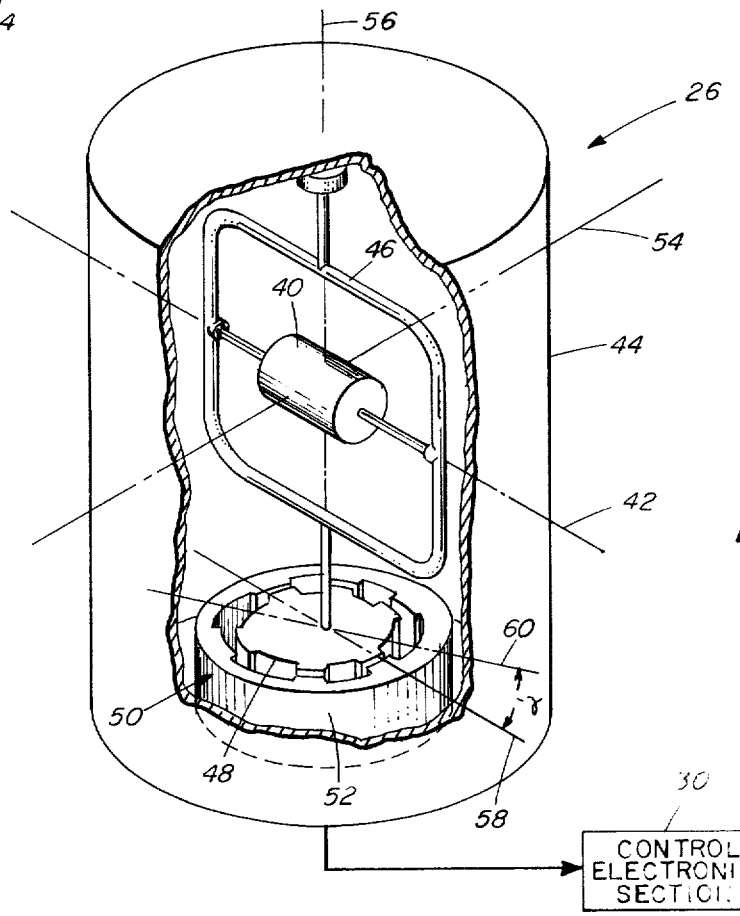
FIG. 2 is a diagrammatical aketch, greatly simplified and somewhat distorted, of a gyro used with the inertially stabilized gimbal platform of FIG. 1, showing the gyro's mass positioned, for exemplary purposes, in the electrical null position.

Referring now to FIG. 2, an exemplary one of the gyros, here 26, is shown in include a mass 40, adapted to rotate about a spin axis 42 in a conventional manner by spin motor means not shown. The mass 40 is rotatably mounted within the case 44 by supporting structure 46 and bearing not shown. The supporting structure 46 has affixed thereto the rotor 48 of a pickoff, here synchro 50. The stator 52 of such synchro 50 is affixed to the case 44 and therefore such snychro 50 provids a conventional gyro pickoff. The electronics and further details of such synchro 50 are not shown as they are conventional and form no part of the present invention. The output of the synchro 50 is coupled to control electronics section 30, the details of which will be discussed later.

As is known, an angular rate about input axis 54, such axis being orthogonal to spin axis 42, will cause a torque to be developed tending to rotate the mass 40 (and hence rotor 48) about output axis 56, such axis being mutually orthogonal to spin axis 42 and input axis 54. The torque, however, is here restrained from tending such rotation by inherent restraining torques due to friction and imperfections in the bearings (not shown) and electromagnetic forces developed by synchro 50 and the spin motor (not shown). As is known if the synchro 50 is disconnected from control electronics section 30, in the absence of an angular rate about input axis 54, the synchro 50 will produce a zero signal when the rotor 48 (and hence mass 40) is aligned with stator 52 in what is hereinafter defined as the electrical null position. Such electrical null position is indicated by line 58. Further, after the gyro is placed in an operating conditon, the rotor 48 (and hence mass 40) will become oriented with respect to the stator 52 in a position hereinafter defined as the mechanical null position (indicated by line 60). Typically, the electrical null position and the mechanical null position will be offset from each other here by an angle $\gamma$, as shown, because of synchro misalignment and uncertainties in knowing, a priori, the mechanical null position.

Figure 3:
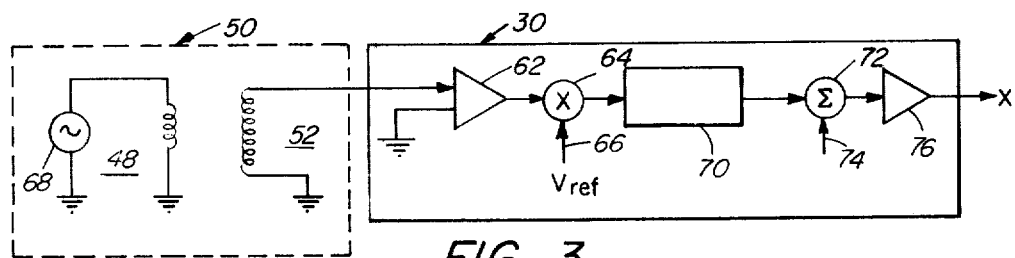
FIG. 3 is a schematic diagram of the pickoff of the gyro shown in FIG. 2 and a control electronics section used in the inertially stabilized platform system in FIG. 1.

Referring now to FIG. 3, the output of synchro 50 is shown connected to control electronics section 30. It is here noted that the control electronics section 30 is similar to and exemplary of control electronics sections 32 and 34. Such control electronics section 30 includes an AC amplifier 62, coupled to the stator 52 of the synchro 50. AC amplifier 62 is coupled to a synchronous detector 64. Such synchronous detector 64 combines the output signal from AC amplifier 62 with a reference signal $V_{ref}$ on line 66. The reference signal has the same frequency as the AC source 68 which is coupled to the synchro 50. The output of synchronous detector 64 is passed through a low pass filter 70 to produce a DC signal representative of the signal produced at the output of synchro 50. The output of low pass filter 70 is applied to a summing network 72. Also applied to such summing network 72 is a control signal on line 74. The details of such control signal will be described later. the output of summing network 72 is applied to amplifier 76. Such amplifier 76 provides the signal X which is applied to computer 33, FIG. 1. It is noted that control electronics section 32 provides the signal Y and the control electronics section 34 provides the Z signal in a similar manner.

Referring again to FIG. 1, the control electronics input selector 80 provides the control signals for lines 74, 82 and 84 in a manner to be described. Lines 74, 82 and 84 are fed to control electronics sections 30, 32 and 34, respectively, as shown. Control electronics input selector 80 may be operated in a set mode S or a command mode C in addition to its normal operating mode. During the set mode, control electronics input selector 80 provides proper control signals which are applied to lines 74, 82 and 84 to initialize the platform 10 so that it may assume its normal operating mode. During the command mode the control electronics input selector 80 provides control signals on lines 74, 82 and 84 for commanding the platform 10 to a desired angular orientation.

Figure 4:
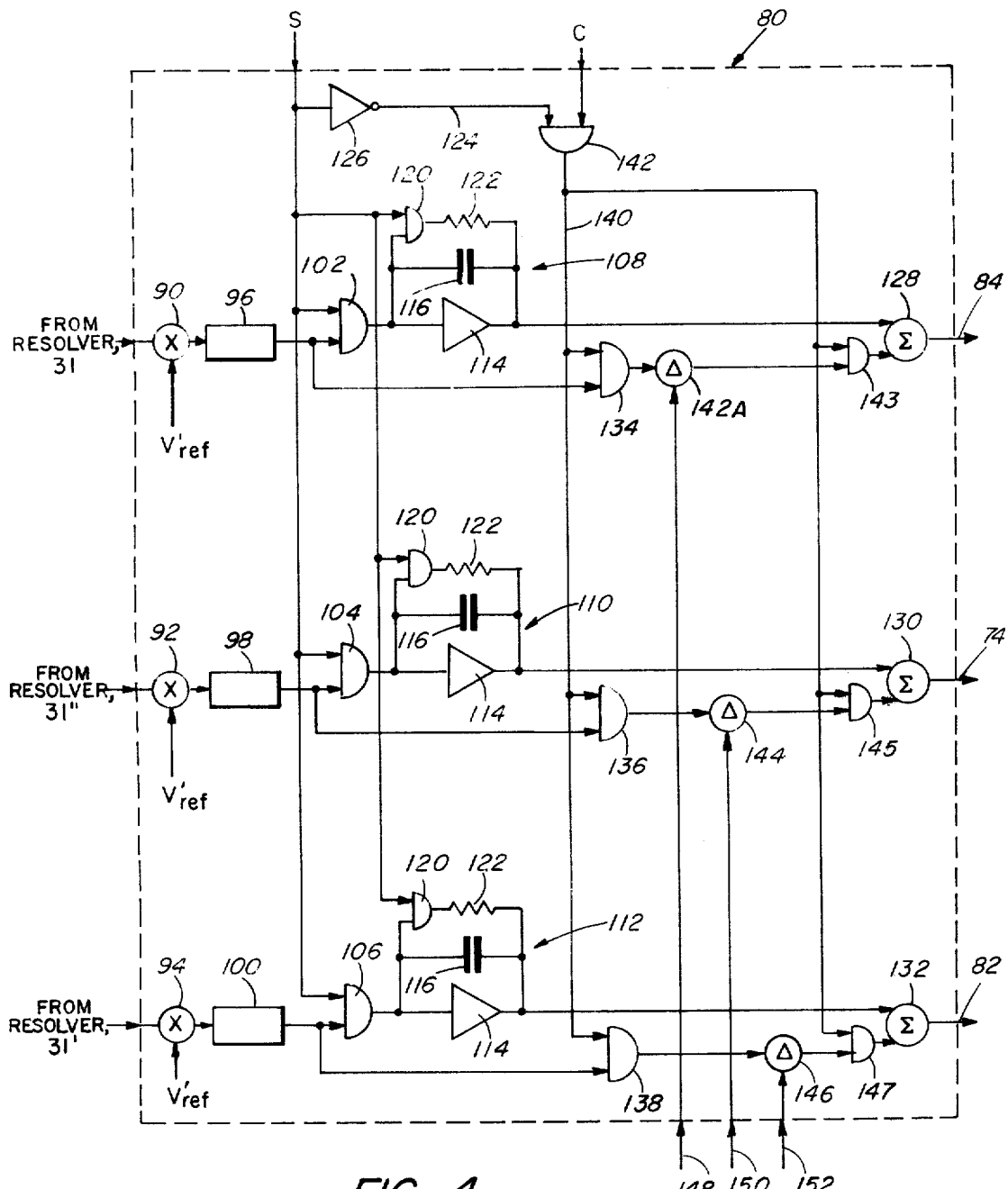
FIG. 4 is a schematic diagram of the control electronics section input selected used in the inertially stabilized gimbal platform system in FIG. 1.

Referring now to FIG. 4, the details of control electronics input selector 80 are shown to include synchronous detectors 90, 92, 94 connected to resolvers 31, 31", 31', respectively, as shown. Also coupled to such synchronous detectors 90, 92, 94 is a reference signal $V'_{ref}$ having a frequency equal to the frequency of a signal source (not shown) used to energize the resolvers 31, 31", 31'. The outputs of synchronous detectors 90, 92, 94 are fed to low pass filters 96, 98, 100, respectively, as shown. The output signal from low pass filters 96, 98, 100 are, therefore, DC signals representative of the signals sin $\psi$, sin $\phi$ and sin $\theta$, respectively, and are applied to gates 102, 104, 106, respectively, as shown.

Also coupled to such gates 102-106 is an enabling line S. During the set mode a signal is applied to line S, thereby enabling the signals produced at the output of low pass filters 96-100 to pass to integrators 108, 110, 112, respectively, as shown. An exemplary one of such integrators, say 108, includes a high gain amplifier 114, having a feedback network (not numbered) coupled thereto, as shown. Such feedback network includes a capacitor 116, shunted by gate 120 and a resistor 122 serially connected thereto, as shown. The gate 120 is coupled to an enabling signal on line S.

In operation, during the set mode after the gyro has reached its operating condition, a signal is apppplied to line S, thereby: (1) coupling the signals from resolvers 31, 31", 31' to integrators 108-110; and (2) connecting resistors 122 in shunt with capacitors 116. The resistors 122 provide damping during the set condition. The signals produced at the output of integrators 108-112 are passed through summing networks 128, 130, 132 to lines 84, 74 and 82, respectively, as shown. In the set mode, because the gyro operates with an offset between the mechanical null position and the electrical null position, synchro 50 produces an offset error signal. This offset error signal causes platform 10 to drift until sufficient voltage builds up on lines 74, 82, 84 to bias out the offset error signal. That is, referring also to FIG. 3, when the steady state condition is reached the voltage on line 74 is equal to (but of opposite polarity from) the voltage out of filter 70. The signal on line 74 is, in effect, proportional to the synchro signal representative of the offset between the electrical and mechanical null positions of the gyro. The signal out of summing network 72 is zero however, and therefore the signal on line 74, by properly biasing out the signal produced by the gyro operating at its mechanical null positon, enables the gyro to operate about the mechanical null position.

Therefore, in such steady state condition the control voltages produced on lines 84, 74 and 82 are the proper voltages to maintain the platform fixed in inertial space and in a drift free condition. However, it is noted that the gyros are operating at their mechanical null positions rather than their electrical null positions. Consequently, the voltages of the control signals represent, and are proportional to, the offset between the electrical and mechanical null positions of the gyros. Further, when steady state condition is reached the signal on line S is removed, thereby; (1) decoupling resistor 122 from capacitor 116, and (2) decoupling the integrators 108, 110, 112 from resolvers 31, 31", 31' respectively, whereby the proper voltage developed across such capacitor becomes stored thereon and maintained on lines 84, 74 and 82 during the normal operating mode of the system.

Also included in the control electronics input selector 80 are gates 134, 136 and 138 coupled to low pass filters 96-100, respectively, as shown. An enabling line 140 to such gates 134-138 is provided. such enabling line 140 is coupled to the output of gate 142, one input of which is conneted to line 124 and the other input of which is connected to line C. Line 124 is coupled to line S through inverter 126, as shown. The outputs of gates 134-138 feed differencing networks 142A, 144, 146 which are applied to summing networks 128-132, respectively, through gates 143, 145, 147 as shown. Line 140 is also connected to gates 143, 145, 157, as shown. Also applied to differencing networks 142A, 144, 146 are command signals on lines 148, 150, 152 as shown. The signals on lines 148-152 are provided by means of a command signal source, 154, (FIG. 1). The command signal source 154 may take any one of a number of forms; here for example it may be a ground communications system whereby a ground control operator, or computer, transmits signals to the vehicle containing the platform 10 to slew or command such platform to a desired angular orientation during the command mode.

In operation, and referring to FIG. 4, during the command mode a signal is applied to line C. Therefore, in the absence of a signal on line S, the signals at the outputs of low pass filters 96-100 are passed through gates 143, 145, 147 to summing networks 128, 130, 132, respectively. It is noted, as previously mentioned, such signals represent the angular orientations, $\psi$, $\theta$, $\phi$, of the platform 10 as sensed by resolvers 31, 31", 31' (because, for small angles $\theta$, $\psi$ and $\phi$, sin $\theta \approx \theta$, sin $\psi \approx \psi$ and sin $\phi \approx \phi$). Therefore, the signal produced at the output of differencing networks 142A, 144, 146 represents the difference between the actual orientation of the platform 10 and the desired or commanded orientation of the platform 10, such commanded orientation being represented by the signals on lines 148, 150, 152, respectively. The signals at the outputs of differencing networks 142A, 144, 146 are passed through gates 143, 145, 147 to summing networks 128-132 because of the enabling signal on line 140. Therefore, because of summing networks 128, 130, 132, the voltages of control signals on liness 84, 74, 82 are modified, in accordance with the command signals (that is, the signals produced at the outputs of differencing networks 142A, 144, 146,) from the voltages stored on capacitors 116. It follows then that the orientation of the platform 10 will change until the signals produced at the output of such differencing networks 142A, 144, 146 are essentially zero. During the period in which the platform changes to the commanded position, the gyro's case 44 (FIG. 2) moves relative to the mass 40 within the gyro off the mechanical null position. As a consequence thereof the electrical signal at the gyro's synchro 50 changes and in accordance therewith an inherent restrain torque, tending to restore the gyro to its mechanical null position, is developed. The inherent restraint torque tends to reorient the mass 40 to the mechanical null position thus producing an error signal at the output of synchro 50. This error signal drives the platform 10 to the commanded position. When the commanded position is reached the signals produced at the outputs of differencing networks 142A, 144, 146 will be zero, the gyros will operate at their mechanical null positions, and the control signals on lines 84, 74 and 82 will be of sufficient voltage to bias out the signals produced by the gyro's synchro 50 which result from such gyros operating at their mechanical null positions.

It is noted that the inherent restraining torques within the gyro in effect produce the torque necessary to drive the platform 10 to the commanded position. Therefore, the desired maximum rate (deg./hr.) of change in platform orientation, $R$, is defined by inherent restraining torque scale factor, $K$, according to the following equation:

$$K = R/\gamma \text{ max}$$

Eq. (3)

where $\gamma$ max is the maximum offset between the electrical and mechanical null positions of the gyro (degrees) and $K$ = inherent restraining torque scale factor (deg./hr.)/deg.

Having described a preferred embodiment of this invention, it will now be apparent to those of skill in the art that changes may be made in such embodiment without departing from the inventive concepts. For example, while single degree of freedom gyros have been described for use with the inertially stabilized gimbal platform, two degrees of freedom gyros may be used in substitution thereof Also rate sensing gyros may be used in place of the rate integrating gyros. Further, the platform may be mounted on a gimbal structure having more or less than three degrees of freedom. Also, the inputs to the control electronics input selector 80 need not be from resolvers as shown but may be from any device which is mounted on the platform to sense the attitude of such platform such as accelerometers or level detectors. It is felt, therefore, that this invention should not be restricted to its disclosed embodiment, but rather should be limited only by the spirit and scope of the appended claims.

What is claimed is:

1. In an inertially stabilized gimbal platform system wherein a gimbal drive means is controlled through an electronic control section by the output of a gyro mounted on a platform in such system, such gyro having an electrical null position and, offset therefrom, a mechanical null position, to stabilize such platform, such electronic control section comprising:

a. a control signal source means, for providing a control signal representative of the offset between the electrical null position and the mechanical null position; and b. means for combining the output signal of the gyro with the control signal to provide an output signal being coupled to the gimbal drive means.

2. The electronic control section recited in claim 1 including means for coupling a platform command signal into such electronic control section to change the control signal in accordance with such platform command signal.

3. The electronic control section recited in claim 1 wherein the control signal causes the gyro to operate about the mechanical null position.

4. The electronic control section recited in claim 3 wherein the inertially stabilized gimbal platform system includes a platform attitude sensing means coupled to the platform, and wherein the control signal source means includes an integrator, coupled between the platform attitude measuring means and the output of the control signal source means.

5. The electronic control section recited in claim 4 wherein the integrator includes means for storing a voltage representative of the control signal.

* * * * *